(12) United States Patent
Mitra et al.

(10) Patent No.: US 12,421,342 B2
(45) Date of Patent: Sep. 23, 2025

(54) CROSSLINKABLE REACTIVE SILICONE ORGANIC COPOLYMERS DISPERSIONS

(71) Applicant: WACKER CHEMIE AG, Munich (DE)

(72) Inventors: Amitabha Mitra, Saline, MI (US); Sarah Burke, Milan, MI (US); Daniel Calimente, Saline, MI (US); Daniel Hwang, Columbus, OH (US); Frank Sandmeyer, Burgkirchen (DE)

(73) Assignee: Wacker Chemie AG, Munich (DE)

( * ) Notice: Subject to any disclaimer, the term of this patent is extended or adjusted under 35 U.S.C. 154(b) by 542 days.

(21) Appl. No.: 17/785,077

(22) PCT Filed: Dec. 18, 2019

(86) PCT No.: PCT/US2019/067016
§ 371 (c)(1),
(2) Date: Jun. 14, 2022

(87) PCT Pub. No.: WO2021/126174
PCT Pub. Date: Jun. 24, 2021

(65) Prior Publication Data
US 2022/0372195 A1    Nov. 24, 2022

(51) Int. Cl.
| | | |
|---|---|---|
| C08F 283/12 | (2006.01) | |
| C08F 2/26 | (2006.01) | |
| C08F 220/14 | (2006.01) | |
| C08F 220/18 | (2006.01) | |
| C08F 220/20 | (2006.01) | |
| C08G 77/20 | (2006.01) | |
| C09D 183/10 | (2006.01) | |

(52) U.S. Cl.
CPC ............ *C08F 283/124* (2013.01); *C08F 2/26* (2013.01); *C08F 220/14* (2013.01); *C08F 220/1804* (2020.02); *C08F 220/20* (2013.01); *C08G 77/20* (2013.01); *C09D 183/10* (2013.01); *C08G 2150/00* (2013.01); *C08L 2201/50* (2013.01); *C08L 2205/18* (2013.01); *C08L 2312/00* (2013.01)

(58) Field of Classification Search
CPC .. C08F 283/124; C08F 220/1804; C08F 2/26; C08F 220/14; C08F 220/20; C08G 77/20; C08G 2150/00; C09D 183/10; C08L 2201/50; C08L 2205/18; C08L 2312/00
See application file for complete search history.

(56) References Cited

U.S. PATENT DOCUMENTS

| | | | |
|---|---|---|---|
| 5,618,879 | A | 4/1997 | Cavivenc et al. |
| 7,674,868 | B2 | 3/2010 | Minge et al. |
| 10,683,434 | B2 * | 6/2020 | Sandmeyer ........ C09D 151/085 |
| 2018/0244855 | A1 * | 8/2018 | Jaunky ................ C08G 77/442 |
| 2018/0305576 | A1 | 10/2018 | Sandmeyer et al. |

FOREIGN PATENT DOCUMENTS

| | | |
|---|---|---|
| EP | 0352339 A1 | 1/1990 |
| EP | 0771826 A2 | 5/1997 |
| EP | 0943634 A1 | 9/1999 |
| EP | 1308468 A1 | 5/2003 |

OTHER PUBLICATIONS

Espacenet Machine Translation of KR20190088797 (Year: 2019).*
Fox T. G., Bull. Am. Physics Soc. 1, 3, p. 123 (1956).
Dissertation "Non-aqueous emulsion polymerizations" presented by Kevin Müller, Mainz 2008, pp. 17-20.
Polymer Properties, Thermal Transitions of Homopolymers (https://www.sigmaaldrich.com/content/dam/sigma-aldrich/docs/Aldrich/General_Information/thermal_transitions_of_homopolymers.pdf).

\* cited by examiner

*Primary Examiner* — John M Cooney
*Assistant Examiner* — Adam J Berro

(57) ABSTRACT

An aqueous dispersion along with methods for producing and uses for the same. Where the aqueous dispersion includes crosslinkable reactive silicone organic copolymers of ethylenically unsaturated monomers and of ethylenically functionalized silicone polymers and is obtainable by means of radically initiated miniemulsion polymerization in an aqueous medium.

19 Claims, No Drawings

CROSSLINKABLE REACTIVE SILICONE ORGANIC COPOLYMERS DISPERSIONS

CROSS-REFERENCE TO RELATED APPLICATIONS

This application is a U.S. National Phase application of PCT Application No. PCT/US2019/067016 filed on Dec. 18, 2019 the disclosure of which is incorporated by reference herein in its entirety.

BACKGROUND OF THE INVENTION

1. Field of the Invention

The invention relates to crosslinkable reactive silicone organic copolymers of ethylenically unsaturated monomers and ethylenically functionalized silicone polymers in the form of aqueous dispersions, and to their preparation and use.

2. Description of the Related Art

Silicone polymers such as silicone resins are used for the chemical modification of organic polymers, or as binders for coatings. For use as coating compositions, EP 943 634 A1 describes aqueous latices which are produced by copolymerizing ethylenically unsaturated monomers in the presence of a silicone resin containing silanol groups. In this case, interpenetrating networks (IPN) are formed between the polymer chains and the polysiloxane chains.

The silicone resin emulsion polymers obtainable by these methods, and the otherwise well-known physical mixtures of silicone resin emulsions and organic polymer dispersions, for use, for example, in the area of silicone resin masonry paints, are notable for the fact that the silicone resin and the organic polymer are present almost exclusively in the form of physical blends. Any construction of chemical bonds between the silicone component and the organic component is by chance, and involves Si—O—C bonds, which are susceptible to hydrolysis. The Si—O—C bond in this case is always competing with the formation of Si—O—Si bridges through condensation of the silanol groups with one another.

A more definite attachment of the silicone building block to the organic polymer ought to take place via the formation of C—C bonds through copolymerization of double-bond-functionalized silicones with organic monomers. Approaches of this kind using linear ethylenically unsaturated polyorganosiloxanes are described in a variety of specifications. For example, EP 1 308 468 A1 teaches hydrophobically modified copolymers, which are obtained by copolymerizing linear silicones having up to two polymerizable groups with organic monomers in emulsion. A similar approach is pursued by EP 352 339 A1, where vinyl-terminated, linear polydimethylsiloxanes are copolymerized with (meth)acrylate monomers.

EP 771 826 A2 describes the emulsion polymerization of (meth)acrylic esters and vinylaromatics, where difunctional silicones containing acrylic groups or vinyl groups are added for crosslinking. U.S. Pat. No. 5,618,879 A pursues this approach as well, and describes reactive aqueous copolymer dispersions which, however, are confined to graft copolymers, formed from organopolysiloxanes having two different functional groups of which at least one is ethylenically unsaturated, with ethylenically unsaturated monomers. These graft copolymers are obtained by radical emulsion polymerization or microsuspension polymerization of the ethylenically unsaturated monomers in the presence of the functional organopolysiloxanes. U.S. Pat. No. 5,618,879 A does in principle allow both linear polyorganosiloxanes and silicone resins, though the proportion of highly crosslinked Q segments in the polyorganosiloxane reactants is limited in U.S. Pat. No. 5,618,879A to below 30%.

The mere presence of the silicone resin during the radical polymerization of the organic monomers does not, however, mean that a chemical bond is also actually produced between the silicone and the organic polymer which forms. In order to understand this, it is necessary to take a closer look at the known mechanisms of radical polymerizations in an aqueous environment. In view of the known incompatibility between silicone polymers and organic polymers, it is obvious to assume formation of a two-phase product, consisting of a silicone phase and an organic polymer phase, with no chemical bonds between the two phases. Bearing in mind in particular that, in standard methods of radical emulsion polymerizations, the polymerization reaction of the organic monomers begins in the water phase, resulting in formation of further-growing micelles, which are supplied with further monomer via the water phase, a copolymerization between a hydrophobic silicone oligomer or silicone polymer, which is unable to access water, by the route of regular radical emulsion polymerization appears fairly unlikely, unless special measures are taken which force a true copolymerization. In the aforementioned specifications, however, no such measures are adopted. In the standard method of radical emulsion polymerization, the emulsion droplets formed primarily during emulsion preparation otherwise become depleted in organic monomer, until finally only the silicone remains, which is able only to polymerize with itself and which so forms a separate phase. If a dispersion of this kind is dried by evaporation of the water, the result is a silicone phase and an organic polymer phase, which are not connected to one another. Since phase separation is brought about during the polymerization procedure, the postulation of interpenetrating networks for products obtained by this route is gratuitous.

Suitable measures which promote or bring about copolymerization between the silicone and the organic monomer component must at any event rule out exclusive or predominant polymerization which includes a transfer of reactant through the water phase. In other words, polymerization must take place in the droplets of reactant or monomer, as is the case for suspension polymerizations with oil-soluble initiators. Suspension polymerization is common in particular for the preparation of vinyl chloride polymers. The suspension polymerization leads to significantly larger particles than the emulsion polymerization (suspension polymerization ≥50 µm, emulsion polymerization <1 µm) and a significantly larger particle size distribution. In the case of suspension polymerization, moreover, lower molecular masses are achieved than in the case of emulsion polymerization. As a result, the products of the suspension polymerization are the preserve of fields of application different to those for products of an emulsion polymerization.

In order to obtain relatively small particle sizes in the suspension polymerization, which in terms of its process may be regarded as a bulk polymerization in water, the possibility exists of microsuspension polymerization, which allows particle sizes of ≥1 µm, in conjunction with the broad particle size distribution to be expected of suspension polymers, and which therefore already moves into the upper range of emulsion polymerization. Smaller particle sizes with a narrow distribution are then possible only by means of emulsion polymerization.

Small-particle copolymer dispersions of particles and silicones, including silicone resins, with organic polymers, prepared by radical polymerization, are taught by U.S. Pat. No. 7,674,868 B2 and US 2018/0305576 A1. In each case the copolymerization between the silicone resin and the organic polymer component is achieved in a miniemulsion polymerization. Particle sizes in the region of less than 100 nm are obtained. The organic monomer is polymerized in the presence of the olefinically unsaturated silicone resin. A combination of water-soluble and oil-soluble initiators ensures that polymerization takes place both in the monomer droplets and in the water phase.

Miniemulsion polymerization also provides advantage over solution polymerization in which the handling of hazardous organic solvents poses environmental and safety risks, as well as inconvenience and cost due to the necessity of removing the organic solvent, for many applications, for example, in waterborne coatings.

SUMMARY OF THE INVENTION

It was an object of the present invention to improve on the prior art by providing stable, especially storage-stable, finely divided crosslinkable reactive silicone organic copolymers in the form of their aqueous dispersions, in which the silicone polymer is bonded to the organic polymer component, the bond in question being an Si—C bond which is stable toward hydrolysis, and in which the copolymers contain additionally crosslinkable reactive groups capable to form a film on a substrate by postcrosslinking with themselves or in the presence of additional crosslinkers.

The object is achieved by the invention.

DETAILED DESCRIPTION OF THE PREFERRED EMBODIMENTS

A subject of the invention are aqueous dispersions of crosslinkable reactive silicone organic copolymers of ethylenically unsaturated monomers and of ethylenically functionalized silicone polymers, obtainable by means of radically initiated miniemulsion polymerization in aqueous medium of (A) one or more ethylenically unsaturated organic monomers, preferably monomers from the group encompassing vinyl esters, (meth)acrylic esters, vinylaromatics, olefins, 1,3-dienes, vinyl ethers and vinyl halides, more preferably methacrylic esters or acrylic esters, in the presence of (B) at least one silicone polymer, preferably silicone resin, which is functionalized with ethylenically unsaturated, radically polymerizable groups and consists of siloxane units of the general formula $$[R^1_p(OR^2)_z SiO_{(4-p-z)/2}] \quad (I),$$

where $R^1$ is identical or different at each occurrence and is a radical R* or E, where R* is identical or different at each occurrence and is a hydrogen atom or is a hydrocarbon radical which is free from aliphatic multiple C—C bonds, has 1 to 18 carbon atoms, preferably a $C_1$-$C_{18}$ alkyl, $C_6$-$C_{18}$ cycloalkyl or $C_6$-$C_{18}$ aryl radical, and may optionally be substituted, and E is an ethylenically unsaturated radical of the formula —$(CR^5_2)_m$—X, preferably —$(CH_2)_3$—X, where m is an integer from 1 to 10, preferably 3, $R^2$ is identical or different at each occurrence and is a hydrogen atom or a hydrocarbon radical having 1 to 18 carbon atoms, preferably a $C_1$-$C_{18}$ alkyl or $C_6$-$C_{18}$ cycloalkyl radical, $R^5$ is a hydrogen atom, a $C_1$-$C_{12}$ alkyl radical or a $C_6$-$C_{18}$ aryl radical, preferably a hydrogen atom, and X is an ethylenically unsaturated organic group, and $R^1$ is an ethylenically unsaturated radical E in at least 1 mol % and at most 50 mol % of all siloxane units (I), p is 0, 1, 2 or 3, and z is 0, 1, 2 or 3, where the sum p+z has a value of 0, 1, 2 or 3, with the proviso that for at least 20 mol % of all siloxane units of the formula (I) in the silicone polymer (B), the sum p+z is 1 or 0, with p being 1 or 0 and z being 0, and in the presence of (C) at least one compound which have an ethylenically unsaturated radical and at least one additional functional group which is not free radically polymerized but capable for crosslinking, in an amount of 6 to 50% by weight, preferably in an amount of 10 to 40% by weight, more preferably in an amount of 10 to 20% by weight, based on the total weight of (A), the miniemulsion polymerization being carried out by preparation in the first step of a solution of at least one silicone polymer (B) in one or more ethylenically unsaturated monomers (A), to give a silicone-in-monomer solution, emulsification in the second step of the resulting silicone-in-monomer solution, using emulsifiers, optionally hydrophobic coemulsifiers, and optionally polymerization inhibitors which prevent premature radical emulsion polymerization, in water in such a way as to give a miniemulsion having a particle size D(50) of not more than 350 nm, preferably not more than 300 nm, more preferably not more than 250 nm, very preferably not more than 200 nm, with the proviso that compound (C) is added in the first step during the preparation of the silicone-in-monomer solution or in the second step during the emulsification to form the miniemulsion, and subjection in the third step of the resulting miniemulsion to radical emulsion polymerization, where the miniemulsion polymerization is carried out using water-soluble or oil-soluble, or a mixture of water-soluble and oil-soluble, polymerization initiators.

A further subject of the invention is a method for producing aqueous dispersions of crosslinkable reactive silicone organic copolymers of ethylenically unsaturated monomers and of ethylenically functionalized silicone polymers by means of radically initiated miniemulsion polymerization in aqueous medium of (A) one or more ethylenically unsaturated organic monomers, preferably monomers from the group encompassing vinyl esters, (meth)acrylic esters, vinylaromatics, olefins, 1,3-dienes, vinyl ethers and vinyl halides, more preferably methacrylic esters or acrylic esters, in the presence of (B) at least one silicone polymer, preferably silicone resin, which is functionalized with ethylenically unsaturated, radically polymerizable groups and consists of siloxane units of the general formula $$[R^1_p(OR^2)_z SiO_{(4-p-z)/2}] \quad (I),$$

where $R^1$ is identical or different at each occurrence and is a radical R* or E, where R* is identical or different at each occurrence and is a hydrogen atom or is a hydrocarbon radical which is free from aliphatic multiple C—C bonds, has 1 to 18 carbon atoms, preferably a $C_1$-$C_{18}$ alkyl, $C_6$-$C_{18}$ cycloalkyl or $C_6$-$C_{18}$ aryl radical, and may optionally be substituted, and E is an ethylenically unsaturated radical of the formula —$(CR^5{}_2)_m$—X, preferably —$(CH_2)_3$—X, where m is an integer from 1 to 10, preferably 3, $R^2$ is identical or different at each occurrence and is a hydrogen atom or a hydrocarbon radical having 1 to 18 carbon atoms, preferably a $C_1$-$C_{18}$ alkyl or $C_6$-$C_{18}$ cycloalkyl radical, $R^5$ is a hydrogen atom, a $C_1$-$C_{12}$ alkyl radical or a $C_6$-$C_{18}$ aryl radical, preferably a hydrogen atom, and X is an ethylenically unsaturated organic group, and $R^1$ is an ethylenically unsaturated radical E in at least 1 mol % and at most 50 mol % of all siloxane units (I), p is 0, 1, 2 or 3, and z is 0, 1, 2 or 3, where the sum p+z has a value of 0, 1, 2 or 3, with the proviso that for at least 20 mol % of all siloxane units of the formula (I) in the silicone polymer (B), the sum p+z is 1 or 0, with p being 1 or 0 and z being 0, and in the presence of (C) at least one compound which have an ethylenically unsaturated radical and at least one additional functional group which is not free radically polymerized but capable for crosslinking, in an amount of 6 to 50% by weight, preferably in an amount of 10 to 40% by weight, more preferably in an amount of 10 to 20% by weight, based on the total weight of (A), the miniemulsion polymerization being carried out by preparation in the first step of a solution of at least one silicone polymer (B) in one or more ethylenically unsaturated monomers (A), to give a silicone-in-monomer solution, emulsification in the second step of the resulting silicone-in-monomer solution, using emulsifiers, optionally hydrophobic coemulsifiers, and optionally polymerization inhibitors which prevent premature radical emulsion polymerization, in water in such a way as to give a miniemulsion having a particle size D(50) of not more than 350 nm, preferably not more than 300 nm, more preferably not more than 250 nm, very preferably not more than 200 nm, with the proviso that compound (C) is added in the first step during the preparation of the silicone-in-monomer solution or in the second step during the emulsification to form the miniemulsion, and subjection in the third step of the resulting miniemulsion to radical emulsion polymerization, where the miniemulsion polymerization is carried out using water-soluble or oil-soluble, or a mixture of water-soluble and oil-soluble, polymerization initiators.

Ethylenically unsaturated monomers (A) used are vinyl esters, preferably those of carboxylic acids having 1 to 15 carbon atoms. Preferred are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 carbon atoms, as for example VeoVa9® or VeoVa10® (trade names of Resolution). Particularly preferred is vinyl acetate.

Suitable monomers form the group of acrylic esters or methacrylic esters are esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, tert-butyl acrylate, tert-butyl methacrylate, 2-ethylhexyl acrylate, and norbornyl acrylate. Particularly preferred are methyl acrylate, methyl methacrylate, n-butyl acrylate, isobutyl acrylate, tert-butyl acrylate, 2-ethylhexyl acrylate, and norbornyl acrylate.

Preferred vinylaromatics are styrene, alpha-methylstyrene, the isomeric vinyltoluenes and vinylxylenes, and also divinylbenzenes. Particularly preferred is styrene.

The vinyl halogen compounds include vinyl chloride, vinylidene chloride, and also tetrafluoroethylene, difluoroethylene, hexylperfluoroethylene, 3,3,3-trifluoropropene, perfluoropropyl vinyl ether, hexafluoropropylene, chlorotrifluoroethylene, and vinyl fluoride. Particularly preferred is vinyl chloride.

An example of a preferred vinyl ether is methyl vinyl ether.

The preferred olefins are ethene, propene, 1-alkylethenes, and also polyunsaturated alkenes, and the preferred dienes are 1,3-butadiene and isoprene. Particularly preferred are ethene and 1,3-butadiene.

Particularly preferred as monomers (A) are one or more monomers from the group of vinyl acetate, vinyl esters of α-branched monocarboxylic acids having 9 to 11 carbon atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene, and 1,3-butadiene. Also particularly preferred as comonomers (A) are mixtures of vinyl acetate and ethylene; mixtures of vinyl acetate, ethylene, and a vinyl ester of α-branched monocarboxylic acids having 9 to 11 carbon atoms; mixtures of n-butyl acrylate and 2-ethylhexyl acrylate and/or methyl methacrylate; mixtures of styrene and one or more monomers from the group of methyl acrylate, ethyl acrylate, propyl acrylate, n-butyl acrylate, 2-ethylhexyl acrylate; mixtures of vinyl acetate and one or more monomers from the group of methyl acrylate, ethyl acrylate, propyl acrylate, n-butyl acrylate, 2-ethylhexyl acrylate, and optionally ethylene; and mixtures of 1,3-butadiene and styrene and/or methyl methacrylate; the stated mixtures may optionally further include one or more of the aforementioned auxiliary monomers.

Examples for compounds (C) used are the following monomers (C):

ethylenically unsaturated alcohols, preferably hydroxyalkyl (meth)acrylates, more preferably 2-hydroxyethyl methacrylate, hydroxypropyl methacrylate, 2-hydroxyethyl acrylate, hydroxypropyl acrylate, and glycerol 1-allyl ether;

ethylenically unsaturated monocarboxylic and dicarboxylic acids and their salts, preferably crotonic acid, acrylic acid, methacrylic acid, fumaric acid and maleic acid;

ethylenically unsaturated sulfonic acids and their salts, preferably vinylsulfonic acid and 2-acrylamido-2-methylpropanesulphonic acid;

ethylenically unsaturated primary, secondary or tertiary amines, preferably 2-dimethylaminoethyl methacrylate, 2-tert-butylaminoethyl methacrylate, allyl N-(2-aminoethyl) carbamate hydrochloride, allyl N-(6-aminohexyl) carbamate hydrochloride, allyl N-(3-aminopropyl) hydrochloride, allylamine and vinylpyridine;

ethylenically unsaturated amides, preferably 3-dimethylaminopropylmethacrylamide and 3-trimethylammoniumpropylmethacrylamide chloride;

ethylenically unsaturated phosphonic acids and their salts, preferably vinylphosphonic acid;

ethylenically unsaturated epoxides, preferably glycidyl methacrylate (GMA);

ethylenically unsaturated isocyanates, preferably 1-(isocyanato-1-methyl)-3-(methylethyl)benzene;

ethylenically unsaturated anhydrides, preferably maleic anhydride;

ethylenically unsaturated monomers containing reactive carbonyl groups, for example, acrolein, methacrolein, diacetone acrylamide, diacetone methacrylamide, 2-butanone methacrylate, formyl styrol, diacetone acrylate, diacetone methacrylate, acetonitrile acrylate, acetoacetoxyethyl methacrylate, acetoacetoxyethyl acrylate and vinylaceto acetate; and ethylenically unsaturated organosilanes with reactive groups, preferably methacryloyloxypropyltrimethoxysilane and vinyltrimethoxysilane.

Particularly preferred monomers (C) are ethylenically unsaturated alcohols, more preferred hydroxyalkyl (meth) acrylate, especially 2-hydroxyethyl methacrylate and 2-hydroxyethyl acrylate.

Therefore, preferred are aqueous dispersions of crosslinkable reactive silicone organic copolymers having hydroxyalkyl groups as functional groups capable for crosslinking.

The crosslinkable reactive silicone organic copolymers are able to crosslink with themselves or with other organic or inorganic compounds as crosslinkers. The crosslinking may be brought about with or without the help of stimulants such as catalyst or initiator, heat, electronic beam irradiation or UV radiation.

Also, drying can activate the crosslinking polymer through changes in pH, oxygen content, evaporation of solvent or carrier, or other changes that causes a reaction to occur. The particular method of achieving crosslinking in the binder polymer is not critical to the present invention. A variety of chemistries are known in the art to produce crosslinking in latexes.

The crosslinkable reactive silicone organic copolymers can crosslink with themselves if two types of crosslinkable functional monomers (C) are chosen, for example an ethylenically unsaturated primary, secondary of tertiary amine, such as 2-aminoethyl methacrylate, and an ethylenically unsaturated anhydride, such as methacrylic anhydride; or for example an ethylenically unsaturated epoxides, such as glycidyl methacrylate, and an ethylenically unsaturated anhydride, such as methacrylic anhydride.

For crosslinking also crosslinkers can be used.

A further subject of the invention are crosslinkable compositions comprising
(1) aqueous dispersions of crosslinkable reactive silicone organic copolymers of the present invention having functional groups capable for crosslinking and
(2) crosslinkers.

The crosslinkers (2) have functional groups capable to react with the functional groups of the copolymer (1).

Preferably are crosslinkable compositions comprising
(1) aqueous dispersions of crosslinkable reactive silicone organic copolymers of the present invention having functional groups, preferably hydroxyalkyl groups, capable for crosslinking by reacting with isocyanate groups, and
(2) organic compounds having 2 or more isocyanate groups as crosslinkers.

Examples for organic compounds having 2 or more isocyanate groups are diisocyanates and polyisocyanates.

Preferred examples for diisocyanates are hexamethylene 1,6-diisocyanate, isophorone diisocyanate, tolylene 2,4-diisocyanate, tolylene 2,6-diisocyanate, phenylene 1,3-diisocyanate, 4,4'-methylenebis(cyclohexyl isocyanate), 4,4'-methylenebis(phenyl isocyanate) and dimethylphenyl diisocyanate.

Examples of polyisocyanates with more than 2 isocyanate groups include polymethylene polyphenylpolyisocyanate and ester of lysine triisocyanate. Mixtures of di/polyisocyanates can be used and also di/polyisocyanates which have been modified by introduction of urethane, allophanate, urea, biuret, uretonimine, uretdione or isocyanurate residues.

Further non-limiting examples for crosslinkers are phenolic resins, amino resins, epoxy resins, beta-hydroxy(alkyl) amide resins, alkylated carbamate resins, isocyanates, polyacids, anhydrides, organometallic acid-functional materials, polyamines, polyamides, aminoplasts, and mixtures thereof.

Non-limiting examples of aminoplasts include condensates of amines and/or amides with aldehyde. The most common amines or amides are melamine, urea, or benzoguanamine. For example, the condensate of melamine with formaldehyde is a suitable aminoplast. However, condensates with other amines or amides can be used; for example, aldehyde condensates of glycoluril. While the aldehyde used is most often formaldehyde, other aldehydes such as acetaldehyde, crotonaldehyde, and benzaldehyde may be used. The aminoplast contains methylol groups and at least a portion of these groups may be etherified with an alcohol to modify the cure response. Any monohydric alcohol may be employed for this purpose including methanol, ethanol, butanol, and hexanol. Non-limiting examples of commercially available aminoplasts that can be used include CYMELR 303, CYMELR 322, CYMEL(R) 327, CYMEL (R) 380, and CYMEL(R) 1130 (available from CYTEK Industries and/or ALLNEX).

Further non-limiting examples for crosslinkers are polyamine compounds. Particularly suitable compounds of this type are the dihydrazides and trihydrazides of aliphatic and aromatic dicarboxylic acids of 2 to 20 carbon atoms. Representative useful polyamines include ethylene diamine, isophorone diamine, diethylenetriamine and dibutylenetriamine. In one embodiment of this invention it is useful to utilize polyhydrazides as the polyamine compounds. Representative useful polyhydrazides include oxalic dihydrazide, adipic dihydrazide, succinic dihydrazide, malonic dihydrazide, glutaric dihydrazide, phthalic or terephthalic dihydrazide and itaconic dihydrazide. Additionally, water-soluble hydrazines such as ethylene-1,2-dihydrazine, propylene-1,3-dihydrazine and butylene-1,4-dihydrazine can also be used as one of the crosslinking agents.

Further non-limiting examples of crosslinkers are polyaziridines; polycarbodiimides; organosilanes, for example, alkoxysilanes that can form crosslinking through condensation reaction with hydroxyl, silanol or carboxylic functionalities of the copolymer; and polyfunctional aldehydes, for example, glyoxal or furaldehydes.

The crosslinker (2) for reaction with the functional group capable for crosslinking in (1) need only be present in an amount necessary to achieve the desired degree of cure. The crosslinker (2) is preferably used in an amount to provide at least 0.1 equivalent of functional groups in (2) for each equivalent of functional group capable for crosslinking in copolymer (1). More preferably the crosslinker (2) is used in an amount to provide between 0.2 to 2.0 equivalent of functional groups in (2) for each equivalent of functional group capable for crosslinking in copolymer (1).

The aqueous dispersions of crosslinkable reactive silicone organic copolymers of the present invention having functional groups, are reactive in such a way that they form films after application on a substrate by crosslinking through reaction with either themselves of with crosslinkers having functional groups capable to react with the functional groups of the copolymer.

A film on a substrate can be formed by applying the aqueous dispersions of crosslinkable reactive silicone organic copolymers of the present invention having functional groups wherein the functional groups are capable for crosslinking with themselves on a substrate and then allowing them to crosslink.

A further subject of the invention is a method for forming a film on a substrate by applying the crosslinkable compositions of the present invention on a substrate and then allowing them to crosslink.

Examples for substrates are metal, wood, plastic or mineral substrates.

The aqueous dispersions of crosslinkable reactive silicone organic copolymers of the present invention can be used as binders for coating compositions, for example, in the field of industrial coating or decorative coating wherein the copolymer dispersions form films primarily through crosslinking reaction involving different functional groups. The cured films provide benefits such as corrosion resistance, hardness, flexibility, toughness, durability, gloss, temperature resistance, dirt repellence, UV resistance, microbial resistance, antiblocking properties, chemical resistance, and water repellence.

The coatings based on aqueous dispersion of the present invention can be applied to a wide range of substrates known in the coatings industry. For example, the coatings of the present invention can be applied to automotive substrates, industrial substrates, packaging substrates, wood flooring and furniture, apparel, cookware, bakeware, electronics, including housings and circuit boards, glass and transparencies or sports equipment, including golf balls.

These substrates can be, for example, metallic or non-metallic. Metallic substrates include, but are not limited to, tin, steel, including electrogalvanized steel, cold rolled steel and hot-dipped galvanized steel, aluminum, aluminum alloys, zinc-aluminum alloys, steel coated with a zinc aluminum alloy, and aluminum plated steel.

Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles and leather both synthetic and natural.

In certain embodiments, the coatings of the present invention can be applied to a coil. For example, in some of these embodiments, the coatings based on the present invention can be applied to a metal coil including, but not limited to, galvanized steel coils and aluminum coils.

The coatings based on aqueous dispersion of the present invention can be applied by any means standard in the art, such as electrocoating, spraying, electrostatic spraying, dipping, rolling or brushing. The coatings of the present invention can be applied to a dry film thickness of 0.2 to 600 µm, such as from 12 µm to 26 µm, or from 21 µm to 25 µm.

The coating compositions based on aqueous dispersion of the present invention can also include other optional materials well known in the art of formulating coatings. For example, the coating compositions of the present invention can also include a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example of colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example of pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketo pyrrolo pyrrole, thioindigo, anthraquinone, indanthrone, anthrapyrimidine, flavanthrone, pyranthrone, anthanthrone, dioxazine, iriarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example of dyes include, but are not limited to, those that are solvent and/or aqueous based, such as phthalo green or blue, iron oxide, bismuth Vanadate, anthraquinone, and perylene and quinacridone.

Example of tints include, but are not limited to, pigments dispersed in water-based or water miscible carriers such as AQUA-CHEM 896, commercially available from Degussa, Inc., *CHARISMA* COLORANTS and MAXITONER INDUSTRIAL COLORANTS, commercially available from Accurate Dispersions Division of Eastman Chemical, Inc.

Other non-limiting examples of materials that can be used with the coating compositions based on aqueous dispersion the present invention include plasticizers, abrasion resistant particles, corrosion resistant particles, corrosion inhibiting additives, fillers including, but not limited to, micas, talc, clays, and inorganic minerals, anti-oxidants, hindered amine light stabilizers, UV light absorbers and stabilizers, surfactants, flow and surface control agents, thixotropic agents, organic cosolvents, reactive diluents, catalysts, reaction inhibitors, and other customary auxiliaries.

In certain embodiments, the coating compositions include pigment particles that may comprise from 20 to 70 weight %, or from 30 to 60 weight % based on total weight of the coating composition. In some of these embodiments, the pigment particles are inorganic pigment particles.

The monomer selection (A), or the selection of the weight fractions of the monomers (A) and (C), is made here so as to result in general in a glass transition temperature Tg of the crosslinkable reactive silicone organic copolymer of preferably ≤60° C., more preferably −50° C. to +60° C., very preferably −30° C. to +50° C., more particularly 0° C. to 30° C. The glass transition temperature Tg of the polymers can be determined in a known way by means of differential scanning calorimetry (DSC). The Tg may also be calculated approximately in advance using the Fox equation. According to Fox T. G., Bull. Am. Physics Soc. 1, 3, page 123 (1956): $1/Tg=x1/Tg1+x2/Tg2+\ldots+xn/Tgn$, where xn is the mass fraction (wt %/100) of the monomer n, and Tgn is the glass transition temperature in kelvins of the homopolymer of the monomer n. Tg values for homopolymers can be found in numerous literature references and standard works of polymer technology, and in tabular works which can be searched on the Internet, such as, for instance, from Aldrich under the entry "Polymer Properties, Thermal Transitions of Homopolymers" (https://www.sigmaaldrich.com/content/dam/sigma-aldrich/docs/Aldrich/General_Information/thermal_transitions_of_homopolymers.pdf).

The fraction of the monomers (A) and (C) in the construction of the copolymers of the invention is preferably ≥20 wt %, more preferably 30 to 95 wt %, based in each case on the total weight of (A), (C) and functionalized silicone polymer (B). This means that the fraction of (B) is preferably <80%, more particularly 5 to 70 wt %, based on the total weight of (A), (C) and functionalized silicone resin (B).

Particularly preferred silicone polymers (B) are silicone resins (B) for which p and z in the general formula

$$[R^1_p(OR^2)_z SiO_{(4-p-z)/2}] \quad (I),$$

have the definition of p=0 or 1 and z=0, 1 or 2, it being the case always that for at least 20 mol % of all siloxane units of the formula (I), p=1 and z=0 or p=0 and z=0, this condition being met preferably, for p=1 and z=0, for at least 30 mol %, more preferably for at least 35 mol % and more particularly for at least 40 mol %, of all siloxane units (I).

It is preferred, moreover, for the siloxane units (I) to contain not more than 50 mol % of what are called Q units, for which p=0 and z=0.

Also suitable, furthermore, are those silicone resins which consist of any desired combination of M units ($R_3SiO_{1/2}$), D units ($R_2SiO_{2/2}$), T units ($RSiO_{3/2}$), and Q units ($SiO_{4/2}$), where R is a radical $R^1$ or radical $-OR^2$, and $R^1$ and $R^2$ have the definition indicated for them above, with the proviso that there are always at least 20 mol % of T units or Q units as per formula (I) for which p=1 and z=0 or p=0 and z=0.

Silicone resins (B) to which maximum preference is given are those which are composed essentially only of T or Q units and D units, with the molar ratio of T/D units being preferably greater than 50/50, more particularly greater than 70/30, and with particular preference only T units without D units, up to a molar ratio of T/D units of up to 20/80. Silicone resins to which maximum preference is given, furthermore, are those which consist predominantly of T units, more particularly those which consist to an extent of at least 80 mol % of T units, very particularly those which consist to an extent of at least 90 mol % of T units. The preferred silicone resins, moreover, are those which carry a small fraction of silicon-bonded alkoxy groups. The synthesis method employed is tolerant toward hydrolyzable alkoxy groups, and so the alkoxy groups are not substantially hydrolyzed; in other words, essentially no hydroxyl groups which are eliminated in the form of water by condensation, leaving behind an Si—O—Si unit, are formed from the alkoxy groups. It is nevertheless preferred for the functional silicone resins used to have a low content of groups of the type $R^2O$, where $R^2$ has the definition indicated for it above, in accordance with formula (I). The greater the number of alkoxy groups present, the lower the degree of condensation of the silicone resin. A high degree of condensation is preferred, since for a given substitution pattern it generally corresponds to a higher glass transition temperature. The higher the glass transition, the less the extent to which the silicone resin components of the copolymer tend to soften, this being an advantage with construction coatings, since in this way a lower soiling propensity can be achieved even in conjunction with relatively high service temperatures.

At least 1 mol % and preferably at most 50 mol %, more preferably at most 40 mol %, of all siloxane units of the formula (I) comprise as their radical $R_1$ an ethylenically unsaturated radical E.

The radical X may be linear, branched or cyclic. In addition to the double bond, further functional groups may also be present, generally being inert toward an olefinic polymerization, examples being halogen, carboxyl, sulfinato, sulfonato, amino, azido, nitro, epoxy, alcohol, ether, ester, thioether and thioester groups, and also aromatic isocyclic and heterocyclic groups. Preferred examples of radicals X are monounsaturated $C_2$ to $C_{10}$ radicals; maximum preference as radical X is possessed by the acrylic and methacrylic radicals.

The hydrocarbon radicals R* free from aliphatic multiple C—C bonds may be, for example, alkyl, cycloalkyl or aryl radicals. Examples of radicals R* are therefore alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, hexadecyl radicals, and octadecyl radicals, such as the n-octadecyl radical; cycloalkyl radicals, such as cyclopentyl, cyclohexyl, cycloheptyl, and methylcyclohexyl radicals; aryl radicals, such as the phenyl, naphthyl, anthryl, and phenanthryl radical; alkaryl radicals such as tolyl radicals, xylyl radicals, and ethylphenyl radicals; and aralkyl radicals, such as the benzyl radical and the β-phenylethyl radical. Particularly preferred radicals R* are the methyl, the isooctyl, the propyl, and the phenyl radical; this recitation is only illustrative and should not be understood as imposing any restriction.

If the radicals R* are substituted, they may additionally contain one or more identical or different heteroatoms selected from O, S, Si, Cl, F, Br, P or N atoms.

Examples of radicals R* are valid in full for radicals $R^2$.

Examples of alkyl radicals R* having 1 to 12 carbon atoms and aryl radicals R* having 6 to 18 carbon atoms are valid in full for $C_1$-$C_{12}$ alkyl and $C_6$-$C_{18}$ aryl radicals $R^5$.

In one preferred embodiment of the invention there are two different radicals R* present in the silicone resins composed of siloxane units (I).

Examples of preferred combinations of radicals R* are the phenyl radical and the methyl radical, the n-butyl radical and the ethyl radical, the n-butyl radical and the methyl radical, the ethyl radical and the methyl radical, the n-octyl radical and the methyl radical, the isooctyl radical and the methyl radical, the isooctyl radical and the phenyl radical, the n-octyl radical and the phenyl radical, the n-octyl radical and the ethyl radical, the phenyl radical and the ethyl radical, the isooctyl radical and the ethyl radical; the combination of phenyl radical and methyl radical, ethyl radical and methyl radical, and isooctyl radical and methyl radical, ethyl radical and isooctyl radical, and phenyl radical and isooctyl radical are particularly advantageous. A combination of methyl and isooctyl radicals and of methyl and phenyl radicals as the two different radicals R* has proven to be particularly effective.

With these two radical combinations it is possible to best control and set the two properties of compatibility in the polymer matrix and high glass transition temperature. Moreover, they ideally meet the requirements for availability and economy.

It is preferred, and has proven to be particularly advantageous, if the siloxane unit (I) having the more carbon-rich substituent is present at not more than 75 mol % of all siloxane units of the formula (I). This means, conversely, that the siloxane unit (I) having the more carbon-poor substituent is present in not less than 25 mol % of all siloxane units of the formula (I). In one particularly preferred embodiment of the invention, the siloxane units of the formula (I) having the more carbon-poor substituent are present in the majority, i.e., at more than 50 mol % of all siloxane units of the formula (I), and therefore carbon-richer substituents are present in the minority, i.e., at less than 50 mol % of all siloxane units of the formula (I).

Carbon-rich substituents R* are carbon-hydrogen radicals, such as alkyl, cycloalkyl or aryl radicals, having 4 to 18 carbon atoms, preferably 6 to 18 carbon atoms, more preferably the isooctyl radical and the phenyl radical, and carbon-poor substituents R* are alkyl radicals having 1 to 3 carbon atoms, preferably the methyl radical.

All ratio figures given are standardized to 100 mol % as the sum of the units of the formula (I) carrying different carbon-rich Si—C bonded radicals.

In the case of the combination of isooctyl radical and methyl radical here it is preferred for there to be more siloxane units of the formula (I) which carry methyl radicals than those which carry isooctyl radicals. The ratio of the number of siloxane units of the formula (I) which carry methyl radicals to the number of siloxane units of the formula (I) which carry isooctyl radicals is preferably 51:49 to 99:1, more preferably 55:45 to 98:2, more particularly 60:40 to 98:2.

Ratios which have proven to be particularly effective are 60:40, 70:30, 90:10, and 95:5.

All these figures are standardized to 100 as the sum of the units of the formula (I) that carry methyl groups and that carry isooctyl groups.

In the case of the combination of phenyl radicals and methyl radicals, ratios below for the number of siloxane units of the formula (I) which carry methyl radicals to the number of siloxane units of the formula (I) which carry phenyl radicals are preferably 51:49 to 99:1, more preferably 55:45 to 98:2, more particularly 60:40 to 98:2.

Ratios which have proven to be particularly effective are 60:40, 70:30, 80:20, 90:10, and 95:5.

All these figures are standardized to 100 as the sum of the units of the formula (I) that carry methyl groups and that carry phenyl groups.

The combination of more than two different radicals is also possible and inventive. In that case the preferred ratios stated above for the combination of two different radicals are valid mutatis mutandis if the carbon-richer substituted siloxane units are counted together and are placed in a ratio to the siloxane unit which carries the smallest, or the least carbon-rich, substituent; in this context, a distinction is to be made, in the manner set out above, between combinations involving aromatic substituents and those not involving aromatic substituents.

In the case where more than two different siloxane units of the formula (I) are present, also, preferred combinations are those of methyl, n-propyl, phenyl, n-butyl, n-octyl, and isooctyl radicals, more particularly of methyl, n-propyl, phenyl, and isooctyl radicals, and especially preferably of methyl, phenyl, n-propyl, and isooctyl radicals.

The ethylenically unsaturated group can be attached to the silicone polymer S through the condensation of a silane of the formula (II) with the silicone polymer S,

$$(R^3O)_{3-n}(R^4)_nSi—(CR^5_2)_m—X \quad \text{(II)}$$

where $R^3$ is a hydrogen atom, a $C_1$-$C_6$ alkyl radical or a $C_6$-$C_{18}$ aryl radical, $R^4$ is a hydrogen atom, a $C_1$-$C_{12}$ alkyl radical or a $C_6$-$C_{18}$ aryl radical, $R^5$ and m have the meaning given above and n is 0, 1 or 2.

The preparation of the silicone polymer (B) is disclosed in US2018/305576A1 (incorporated by reference) on page 6, paragraph [0083] to page 7, paragraph [0089].

It has been found that the readily available gamma-silanes (m=3) are very suitable for implementing the invention, in spite of the lower reactivity of the gamma-silanes as compared with the alpha-silanes. It has been found that the invention is in principle also possible with small amounts of gamma-silanes used for functionalizing the silicone polymer, of only 1.0 wt % of silane, based on the total amount of silicone polymer used, but it has emerged that for the purpose of the more complete incorporation of the silicone resin it is advantageous to use at least 1.5 wt % of gamma-silane, preferably at least 2.0 wt %, more preferably at least 2.5 wt % of gamma-silane, and more particularly at least 3.0 wt % of gamma-silane; the most-preferred amount is between 4 and 8 wt %, since it is in this range that the best balance is obtained between efficiency and economy.

Moreover, in the miniemulsion polymerization, there may optionally also be hydrophobic coemulsifiers present in amounts of up to 3 wt %, based on the total weight of component (A) and of functionalized component (B). In the present case, silicone polymers may often take on the function of the coemulsifier. Further examples of coemulsifiers are hexadecane, cetyl alcohol, oligomeric cyclosiloxanes, such as octamethylcyclotetrasiloxane, for example, or else vegetable oils such as rapeseed oil, sunflower oil or olive oil. Also suitable are organic or inorganic polymers having a number-average molecular weight Mn of less than 10 000.

Hydrophobic coemulsifiers particularly preferred in accordance with the invention are the silicone polymers to be polymerized, themselves, and hexadecane.

The copolymers are prepared in a heterophase process by the known technique of miniemulsion polymerization. Miniemulsion polymerizations differ in a number of key points from emulsion polymerization. See the following in this regard: Dissertation "Non-aqueous emulsion polymerizations" presented by Kevin Müller, Mainz 2008, pp. 17-20, and references cited therein:

In contrast to emulsion polymerization, where the size of the polymer latex particles is determined essentially by kinetic processes and the stability of the lattices, the basis for miniemulsion polymerization is that the monomer even before the polymerization is present completely within micelles and therefore need no longer diffuse from the monomer droplets into the micelles during the polymerization. In other words, therefore, the latex particles formed may be regarded as polymerized copies of the monomer droplets present at the start. A consequence of this is that the size of the latex particles is determined exclusively by the dispersion process and by the stability of the monomer-filled micelles. Since there is no need for transport of monomer through the continuous phase, it is possible in this way to enable the use also of monomers which are absolutely insoluble in the continuous phase. To increase the stability of the monomer droplets it is necessary to suppress Ostwald ripening that takes place. During the miniemulsion polymerization of the dispersed monomer phase, a hydrophobe or, in the case of inverse miniemulsions, a lipophobe is therefore added.

Among the species which may act as a hydrophobe, optionally, is a hydrophobic monomer suitable for the purpose, such as, for example, a silicone component.

The miniemulsion polymerization differs here from suspension polymerization in two respects: firstly, the resulting polymer particles in the miniemulsion process are much smaller (50-500 nm) than those of the suspension polymerization (1µ-1 mm). Secondly, the number of radicals per growing particle in the suspension polymerization, at 10, is well above those of the miniemulsion polymerization, where, viewed statistically, there is 0.5 radical per growing particle during the reaction.

In order to carry out a radical miniemulsion polymerization it is first of all necessary to construct a miniemulsion of a vinyl monomer in a continuous phase which is not miscible with said monomer. For this purpose, the monomer, together with the emulsifier and the hydrophobe, is dispersed in water by input of energy, using, for example, a high-pressure homogenizer or by means of ultrasound. Here, the combination of emulsifier and hydrophobe retards the occurrence of Ostwald ripening and the coalescence of the monomer droplets. In the second stage, the monomer droplets formed in this way are polymerized. This may be triggered either by a water-soluble initiator, which is added after preparation of the stable miniemulsion, or by oil-soluble initiators, which may be present in the monomer phase right from the start, or by a combination of both.

The monomer droplets formed in the miniemulsion have, approximately, a size of 50-500 nm. This small size is a consequence of the homogenization of the miniemulsion, achieved through the input of high quantities of energy. The transfer of monomer between the individual droplets is suppressed by the specific type of stabilization.

Also, parallel to the small monomer droplets, there are no longer any free micelles present in the miniemulsion. In contrast to the conventional emulsion polymerization, therefore, it is primarily the droplets which are the locus of nucleation (droplet nucleation). During the miniemulsion polymerization, accordingly, there is also only extremely slight diffusion of the monomers observed. Within a miniemulsion polymerization, consequently, each dispersed monomer droplet may be described as an individual reactor operated at a nanoscopic level. As a consequence, a number of advantages result for this method, in contrast to the traditional emulsion and suspension polymerizations, and these advantages will be highlighted below:

Because the monomer does not have to be transported through the continuous, usually aqueous phase, it is possible in miniemulsions to polymerize even monomers that are absolutely insoluble in water.

The size of the latex particles usually corresponds to that of the monomer droplets formed beforehand, and can be adjusted with considerable precision via the nature and amount of the emulsifier used.

Each monomer droplet is homogeneous in its composition. Specifically for copolymerizations, therefore, the monomer ratio in each droplet is the same and is not subject to a difference in diffusion of the monomers.

The amounts of emulsifier used are smaller, since the miniemulsion is stabilized only kinetically, but not thermodynamically.

The step essential to the process, the step of preparing the finely divided miniemulsion, is executed in the present, inventive case as follows:

In the first step, one or more silicone polymers, preferably silicone resins, composed of siloxane units of the formula (I) are dissolved in one or more ethylenically unsaturated monomers, giving a silicone resin-in-monomer solution. Characteristic here is the fact that the silicone resins composed of siloxane units of the formula (I) are soluble in the respective monomer mixture. Insoluble constituents are separated off, as and when appropriate, by filtration. The only silicone resin-in-monomer solutions that are in accordance with the invention are those containing no insoluble silicone constituents.

The silicone resin-in-monomer solution is optionally admixed with a hydrophobic coemulsifier. Examples of hydrophobic coemulsifiers are identified earlier on above.

In the second step, the silicone resin-in-monomer solution is emulsified with water and at least one emulsifier, and optionally with further auxiliaries, such as polymerization inhibitors which prevent the premature radical emulsion polymerization, in such a way, preferably with application of high shearing force, as to obtain emulsions having particle sizes D(50) of not more than 350 nm, known as miniemulsions. High shearing force in this context may be generated by means of suitable emulsifying equipment, such as conventional rotor-stator systems, or in other ways that are common knowledge, as for example by high-pressure homogenizers, dissolver disks, ultrasound devices or comparable emulsifying technologies allowing a high shearing force to be exerted that permits the generation of small particles of not more than 200 nm, giving miniemulsions having particle sizes D(50) of not more than 350 nm. In the case of commercial rotor-stator systems, rotary speeds of 4000-12 000, preferably of 5000-11 000, more particularly of 6000-10 000, have proven to be particularly advantageous. Both continuous and discontinuous embodiments are suitable. In the case of high-pressure homogenizers, pressures of preferably 300 bar-1000 bar, more preferably of 350 bar-900 bar, more particularly of 400 bar-800 bar, have proven to be advantageous. Since the preparations are polymerizable, effective temperature monitoring is important; i.e., the temperatures of the miniemulsions are not to exceed preferably 60° C., more preferably 55° C., more particularly 50° C., and in such an event are to be rapidly cooled back down below these temperatures.

Silicone resin-in-monomer solutions of the invention possess viscosities of 2-20 000 mPas at 25° C., preferably of 5-15 000 mPas at 25° C., more particularly of 7-10 000 mPas at 25° C. The miniemulsions of the invention possess viscosities of 2-5000 mPas at 25° C., particularly of 3-4500 mPas at 25° C., more particularly of 5-4000 mPas at 25° C.

The amount of water in the miniemulsons of the invention is 80-weight percent, preferably 75-20, more particularly 70-25 weight percent.

The particle size D(50) in the miniemulsions of the invention is not more than 350 nm, preferably not more than 300 nm, more preferably not more than 250 nm, very preferably not more than 200 nm, and at least 20 nm, preferably at least 30 nm, and more preferably at least 50 nm.

The miniemulsions of the invention consist of a continuous water phase and a dispersed organic phase.

The organic phase of the miniemulsions is polymerized by the process of radical emulsion polymerization. In this case, in a third step, the dispersed silicone resin-in-monomer solution is subjected to free radical polymerization. This radical emulsion polymerization is preferably executed by metered addition of the miniemulsion to an initial charge comprising water and a portion of catalyst. Further metered feeds comprise the polymerization initiator, which may optionally encompass a plurality of components, each of which is separately metered in or included in the initial charge, according to their mutual interaction and function in the polymerization procedure.

When miniemulsion polymerization has been completed, the resulting dispersion, where necessary, is adjusted for the desired pH, optionally filtered, and is then available for the respective use.

The reaction temperatures in the miniemulsion polymerization are preferably 0° C. to 100° C., more preferably 5° C. to 80° C., very preferably 30° C. to 70° C.

The pH of the dispersing medium is between 2 and 9, preferably between 4 and 8. In one particularly preferred embodiment it is between 4.5 and 7.5. The pH can be adjusted before the start of the reaction by means of hydrochloric acid or aqueous sodium hydroxide solution. The polymerization may be carried out batchwise or continuously, with the inclusion of all or individual constituents of the reaction mixture in the initial charge, with individual constituents of the reaction mixture being included part in the initial charge and part metered in subsequently, or by the metering method without an initial charge. All metered feeds are made preferably at the rate at which the component in question is consumed.

The polymerization is initiated by means of the customary water-soluble initiators or redox-initiator combinations, preferably with the latter. Examples of initiators are the sodium, potassium, and ammonium salts of peroxodisulfuric acid, hydrogen peroxide, tert-butyl peroxide, tert-butyl hydroperoxide, potassium peroxodiphosphate, tert-butyl peroxopivalate, cumene hydroperoxide, isopropylbenzene monohydroperoxide, and azobisisobutyronitrile. The stated initiators are used preferably in amounts of 0.01 to 4.0 wt %, based on the total weight of the monomers. As redox-initiator combinations, initiators identified above are used in conjunction with a reducing agent. Suitable reducing agents are sulfites and bisulfites of monovalent cations, an example being sodium sulfite, or the derivatives of sulfoxylic acid such as zinc or alkali metal formaldehydesulfoxylates, as for example sodium hydroxymethanesulfinate, and ascorbic acid. The amount of reducing agent is preferably 0.15 to 3 wt % of the monomer amount used. Additionally, small amounts of a metal compound which is soluble in the polymerization medium and whose metal component is redox-active under the polymerization conditions may be introduced, this compound being based for example on iron or vanadium. One particularly preferred initiator system comprising the aforementioned components is the system tert-butyl hydroperoxide/sodium hydroxymethanesulfinate/Fe (EDTA)$^{2+/3+}$. According to the miniemulsion polymerization methodology, it is also possible to use predominantly oil-soluble initiators, such as cumene hydroperoxide, isopropylbenzene monohydroperoxide, dibenzoyl peroxide or azobisisobutyronitrile. Preferred initiators for miniemulsion polymerizations are potassium persulfate, ammonium persulfate, azobisisobutyronitrile, and dibenzoyl peroxide.

The dimensions of the silicone domains within the copolymer after copolymerization has taken place are preferably in the range from 5 nm to 150 nm, more particularly from 10 nm to 140 nm, and especially preferably from 15 nm to 125 nm. The dimensions may be determined, for example, by scanning electron microscopy or transmission electron microscopy on the polymer dispersions or on the polymer films obtained from them.

PREPARATIVE EXAMPLES

In the present text, substances are characterized by reporting of data obtained by means of instrumental analysis. The underlying measurements are carried out either in accordance with publicly accessible standards or are determined using specially developed techniques. In order to ensure the clarity of the teaching imparted, the methods used are specified hereinbelow. In all examples, all figures for parts and percentages are given by weight, unless otherwise indicated.

Viscosity:

The viscosities, unless otherwise indicated, are determined by measurement using rotational viscometry in accordance with DIN EN ISO 3219. Unless indicated otherwise, all viscosity figures are for 25° C. and atmospheric pressure of 1013 mbar.

Molecular Compositions:

The molecular compositions are determined by nuclear magnetic resonance spectroscopy (regarding terminology see ASTM E 386: High-Resolution Nuclear Magnetic Resonance Spectroscopy (NMR): terms and symbols), with measurement of the 1H nucleus and the 29Si nucleus.

Description of $^1$H NMR Measurement
    Solvent: CDCl3, 99.8% d
    Sample concentration: about 50 mg/i ml CDCl3 in 5 mm NMR tubes Measurement without addition of TMS, referencing of spectra with residual CHCl3 in CDCl3 at 7.24 ppm
    Spectrometer: Bruker Avance 400
    Sample head: 5 mm BBO sample head or SMART sample head (from Bruker)
    Measurement Parameters:
    Pulprog=zg30
    TD=64k
    NS=64 or 128 (depending on the sensitivity of the sample head)
    SW=20.6 ppm
    AQ=3.17 s
    D1=5 s
    SFO1=500.13 MHz
    O1=6.175 ppm
    Processing parameters:
    SI=32k
    WDW=EM
    LB=0.3 Hz According to the type of spectrometer used, individual adjustments to the measurement parameters may be required.

Description of $^{29}$Si NMR Measurement
    Solvent: C$_6$D6 99.8% d/CCl4 1:1 v/v with 1 wt % Cr(acac)3 as relaxation reagent
    Sample concentration: about 2 g/1.5 ml solvent in 10 mm NMR tubes
    Spectrometer: Bruker Avance 400
    Sample head: 10 mm 1H/13C/15N/29Si glass-free QNP sample head (from Bruker)
    Measurement parameters:
    Pulprog=zgig60
    TD=64k NS=1024 (depending on the sensitivity of the sample head)
SW=200 ppm
AQ=2.75 s
D1=4 s
SFO1=300.13 MHz
O1=−50 ppm
Processing parameters:
SI=64k
WDW=EM
LB=0.3 Hz According to the type of spectrometer used, individual adjustments to the measurement parameters may be required.

Molecular Weight Distributions:

Molecular weight distributions are determined as the weight average Mw and the number average Mn, employing the method of gel permeation chromatography (GPC or size exclusion chromatography (SEC)) with polystyrene standard and a refractive index detector (RI detector). Unless specified otherwise, THF is used as the eluent and DIN 55672-1 is employed. The polydispersity is the quotient Mw/Mn.

Glass Transition Temperatures:

The glass transition temperature is determined by Differential Scanning Calorimetry (DSC) according to DIN 53765, pierced crucible, heating rate 10 K/min.

Determination of the Particle Size:

The particle sizes were measured by the method of Dynamic Light Scattering (DLS) with determination of the zeta potential. Z-average particle size was measured with a Malvern Zetasizer Nano ZS Particle Size Analyzer. The polydispersity (PDI) of the particle size indicates the width of the size distribution.

MEK Double Rub Test:

This test method is used to determine the degree of cure of a film by the film resistance to a specified solvent. Methyl ethyl ketone (MEK) is used as the solvent.

The MEK Double Rub Test is carried out according to ASTM D5402 The higher the value of the MEK Double Rub Test the better the curing, i.e. the crosslinking, of the film.

Preparation of an ethylenically unsaturated phenyl silicone resin B1 by condensation of an ethoxy-functional phenyl silicone resin with methacryloxypropyltrimethoxysilane $(CH_3O)_3Si(CH_2)_3OC(=O)C(CH_3)=CH_2$ A 1 L four-necked flask equipped with a reflux condenser, a thermometer, a nitrogen inlet, and an overhead stirrer is charged with 150 g of methanol, 20.45 g of 3-methacryloxypropyltrimethoxysilane, and 319.4 g of a silicone resin consisting of 60 mol % of $PhSiO_{3/2}$ units (=$T^{Ph}$ units), 36 mol % of $MeSiO_{3/2}$ units (=T units), and 4 mol % of $Me_2SiO_{2/2}$ units (=D units), with 14.2 wt % of MeO radicals distributed statistically over the T units, possessing a molecular weight $M_W$ of 1800 g/mol and a viscosity of 440 mPa·s at 25° C. After the mixture is heated to 40° C., a solution of 0.40 g of 37% aqueous hydrochloric acid in 10 g of deionized water is added over the course of 5 min. The mixture is refluxed with stirring at 65° C. for 2 h, followed by neutralization by addition of a solution of 0.69 g of 30% sodium methoxide in methanol diluted in additional 3.50 g of methanol. The resulting solution is distilled at 20 mbar and 55° C. to remove all volatile constituents. This produces 297 g of a slightly turbid liquid with the following properties:

Molecular Weight and Nonuniformity:
$M_w$=4577 g/mol
$M_n$=1526 g/mol
PD=3.00

Molecular Composition from 1H NMR and $^{29}$Si NMR:
$Me_2SiO_{2/2}$: 7.02 mol %
$(Ph)SiO_{3/2}$: 58.65 mol %
$((CH_2)_3OC(=O)C(CH_3)=CH_2) SiO_{3/2}$: 2.47 mol %
MeO—Si: 31.36 mol %

Preparation of an Ethylenically Unsaturated Silicone Resin B2 by Condensation of an Ethoxy-Functional Silicone Resin with Methacryloxypropyltrimethoxysilane $(CH_3O)_3Si(CH_2)_3OC(=O)C(CH_3)=CH_2$ A 3 L four-necked flask equipped with a reflux condenser, a thermometer, a nitrogen inlet, and an overhead stirrer is charged with 900 g of tetraethyl silicate oligomer, 366 g of hexamethyldisiloxane, 60 g of 3-methacryloxypropyltrimethoxysilane, and 313.20 g of a low-viscosity, OH-terminated polydimethylsiloxane having on average 45 siloxane units. To this mixture is added a solution of 1.10 g of 37% hydrochloric acid in 220.5 g of deionized water. The mixture is heated to 60° C., at which point the reaction sets in exothermically and heats itself to 75° C. Heating is reapplied to reach a temperature of 79° C., where the reaction is kept at reflux with stirring for 60 minutes. The reaction mixture is cooled to below 50° C. and transferred to a rotary evaporator flask. While heating at 55° C., vacuum is slowly applied until 300 g of ethanol is removed, then the reaction mixture is neutralized by addition of 2.18 g of a 30% solution of sodium methoxide in methanol. 400 g of 2-ethylhexyl acrylate (2-EHA) are added along with 0.400 g of butylated hydroxytoluene (BHT), and the mixture is gravity filtered through a 100 μm filter. Distillation is resumed at 60° C. and 20 mbar to remove the remaining volatile components. This produces 1433 g of a clear silicone resin solution in 2-ethylhexyl acrylate (2-EHA), consisting of 28.65 wt % of 2-EHA and 71.35 wt % silicone resin with the following properties:

Molecular Weight and Nonuniformity (Toluene Used as Eluent):
Mw=2370 g/mol
Mn=1447 g/mol
PD=1.64

Molecular Composition from 1H NMR and $^{29}$Si NMR:
$Me_3SiO_1/2$: 17.49 mol %
$Me_2SiO_{2/2}$: 33.80 mol %
$((CH_2)_3OC(=O)C(CH_3)=CH_2) SiO_{3/2}$: 1.25 mol %
$SiO_{4/2}$: 28.30 mol %
EtO-Si: 4.63 mol %
MeO—Si: 0.26 mol %

Preparation of an Ethylenically Unsaturated Phenyl Silicone Resin CB1

A 3 L four-necked flask equipped with a reflux condenser, a thermometer, a nitrogen inlet, and an overhead stirrer is charged with 623.7 g of absolute ethanol, 41.6 g of deionized water, 0.62 g of 37 wt % hydrochloric acid, 74.85 g of phenyltriethoxysilane, 47.77 g of 3-methacryloxypropyltrimethoxysilane, and 673.5 g of methyltriethoxysilane oligomer (available under the trade name TRASIL® at WACKER Chemie AG) containing approximately 30 wt % silicon bonded ethoxy groups. These ingredients are mixed and refluxed at 80° C. for 2 h, after which the mixture is neutralized by the addition of 1.15 g of a 30% solution of sodium methoxide in methanol. Distillation is carried out to remove 330 g of ethanol, followed by filtration of the reaction through a 100 μm filter. The resulting solution is distilled at 80° C. and 20 mbar for two hours to remove volatile components, which produces 522 g of a turbid, highly viscous silicone resin.

Molecular Weight and Nonuniformity (toluene used as eluent):
Mw=3401 g/mol
Mn=1126 g/mol
PD=3.02

Preparation of an Ethylenically Unsaturated Silicone Resin CB2 by Condensation of Ethoxy-Functional Silicone Resin with Methacryloxypropyltrimethoxysilane

$(CH_3O)_3Si(CH_2)_3OC(=O)C(CH_3)=CH_2$

A 3 L four-necked flask equipped with a reflux condenser, a thermometer, a nitrogen inlet, and an overhead stirrer is charged with 900 g of tetraethyl silicate oligomer, 366 g of hexamethyldisiloxane, 60 g of 3-methacryloxypropyltrimethoxysilane, and 313.20 g of a low-viscosity, OH-terminated polydimethylsiloxane having on average 45 siloxane units. To this mixture is added a solution of 1.10 g of 37% hydrochloric acid in 220.5 g of deionized water. The mixture is heated to 60° C., at which point the reaction sets in exothermically and heats itself to 75°. Heating is reapplied to reach a temperature of 79° C., where the reaction is kept at reflux with stirring for 60 minutes. The reaction mixture is cooled to below 50° C. and transferred to a rotary evaporator flask. While heating at 55° C., vacuum is slowly applied until 315 g of ethanol is removed, then the reaction mixture is neutralized by addition of 3.01 g of a 30% solution of sodium methoxide in methanol. 400 g of butyl acrylate are added along with 0.400 g of butylated hydroxytoluene (BHT), and the mixture is gravity filtered through a 100 μm filter. Distillation is resumed at 60° C. and 20 mbar to remove the remaining volatile components. This produces 1255 g of a clear silicone resin solution in butyl acrylate, consisting of 17.67 wt % of butyl acrylate and 82.33 wt % silicone resin with the following properties:

Molecular Weight and Nonuniformity:
Mw=7100 g/mol
Mn=3130 g/mol
PD=2.27

Molecular Composition from 1H NMR and $^{29}$Si NMR:
$Me_3SiO_{1/2}$: 16.70 mol %
$Me_2SiO_{2/2}$: 47.50 mol %
$((CH_2)_3OC(=O)C(CH_3)=CH_2) SiO_{3/2}$: 0.46 mol %
$SiO_{4/2}$: 20.87 mol %
EtO-Si: 4.51 mol %
MeO—Si: 0.14 mol %

Inventive Example 1: Preparation of Copolymer Dispersion E1 from the Silicone Resin B1

Step 1: Preparation of Miniemulsion:

The miniemulsion is prepared by dissolving the silicone resin B1 in a mixture of (meth)acrylic monomers (the monomer combination includes 2-Hydroxyethyl methacrylate, which has hydroxy group in addition to radically polymerizable methacrylate group), followed by high pressure homogenization. The aim of the homogenization is to achieve a z-average particle size of 200 nm. Following is an example that uses an IKA® HPH 2000/5 high pressure homogenizer to prepare the miniemulsion:

The following components are added to a sealable vessel and mixed on an orbital shaker:

| | |
|---|---|
| Silicone resin B1 | 260.00 g |
| Butyl acrylate | 250.40 g |
| Methyl methacrylate | 202.88 g |

-continued

| | |
|---|---|
| Hexadecane | 3.51 g |
| Total | 716.79 g |

The resulting mixture is combined with a solution of the following components and mixed on an orbital shaker for approximately 1 h:

| | |
|---|---|
| Sodium dodecyl sulfate (SDS) | 24.44 g |
| Hydroquinone monomethylether (2% solution in water) | 3.77 g |
| Deionized water | 455.00 g |

The following component is added to the above mixture in 20 g portions over 1 h and mixed on an orbital shaker until a stable pre-emulsion is formed:

| | |
|---|---|
| 2-Hydroxyethyl methacrylate (HEMA) | 100.00 g |
| Total | 1300.00 g |

The pre-emulsion is passed through the high pressure homogenizer at a pressure of 400-800 bar to obtain a miniemulsion with a z-average particle size of 101 nm (PDI=0.16).

Step 2: Polymerization

A 3 L polymerization vessel, equipped with an anchor stirrer, a reflux condenser, a thermometer, and a nitrogen inlet, is charged with 0.108 g ethylenediaminetetraacetic acid (EDTA) disodium salt, 0.108 g of iron ammonium sulfate hexahydrate, 250.17 g of deionized water, and 72 g of the miniemulsion prepared in Step 1 as the initial charge and heated to 50° C. In one sealable vessel (feed 1), a solution of 4.62 g of tertiary butyl hydroperoxide (TBHP) in 38.58 g of deionized water is prepared. In a second sealable vessel (feed 2), a solution of 2.31 g of a formaldehyde-free reducing agent (Bruggolite®FF6 M) in 43.86 g of deionized water is prepared. In a third vessel (feed 3) is placed 828 g of the miniemulsion. Feed 1 and 2 are started at a rate of 230 μL/min, followed by the start of feed 3 at a rate of 5.0 mL/min to be continuously metered over a period of 165 minutes. Feeds 1 and 2 are continued for an additional 40 minutes after the completion of feed 3, and the reaction is then held at 50° C. for 90 minutes further. After cooling to room temperature, the product is adjusted to a pH of 8 by the addition of aqueous ammonia and filtered through a 100 μm filter to give a dispersion with the following properties:
Specific gravity: 1.068;
Glass transition temperature: 17.0° C.;
Solids content: 42.97%;
Total remaining free monomer: <200 ppm
Z-average particle size: 173 nm (PDI=0.20)

Inventive Example 2: Preparation of Copolymer Dispersion E2 from the Silicone Resin B2

Step 1: Preparation of Miniemulsion

The miniemulsion is prepared by dissolving the ethylenically unsaturated silicone resin B2 in a mixture of (meth) acrylic monomers (the monomer combination includes 2-Hydroxyethyl methacrylate, which has hydroxy group in addition to radically polymerizable methacrylate group), followed by high pressure homogenization. The aim of the homogenization is to achieve a z-average particle size of 200 nm. Following in an example that uses an IKA® HPH 2000/5 high pressure homogenizer to prepare the miniemulsion:

Preparation of the silicone resin and (meth)acrylate monomer mixture:

The following components are added to a sealable vessel and mixed on an orbital shaker:

| Silicone resin in 2-EHA (B2) | 364.40 g |
|---|---|
| Butyl acrylate | 150.00 g |
| Methyl methacrylate | 198.88 g |
| Hexadecane | 3.51 g |
| Total | 716.79 g |

The resulting mixture is combined with a solution of the following components and mixed on an orbital shaker for approximately 1 h:

| Sodium dodecyl sulfate (SDS) | 24.44 g |
|---|---|
| Hydroquinone monomethylether (2% solution in water) | 3.77 g |
| Deionized water | 455.00 g |

The following component is added to the above mixture in 20 g portions over 1 hour and mixed on an orbital shaker until a stable pre-emulsion is formed:

| 2-Hydroxyethyl methacrylate | 100.00 g |
|---|---|
| Total | 1300.00 g |

The pre-emulsion is passed through the high pressure homogenizer at a pressure of 400-800 bar to produce a miniemulsion with a z-average particle size of 130 nm (PDI=0.11).

Step 2: Polymerization

A 3 L polymerization vessel equipped with an anchor stirrer, a reflux condenser, a thermometer, and a nitrogen inlet is charged with 0.108 g ethylenediaminetetraacetic acid (EDTA) disodium salt, 0.108 g of ironammoniumsulfate hexahydrate, 250.17 g of deionized water, and 72 g of the miniemulsion prepared in Step 1 as the initial charge and heated to 50° C. In one sealable vessel (feed 1), a solution of 4.62 g of tertiary butyl hydroperoxide (TBHP) in 38.58 g of deionized water is prepared. In a second sealable vessel (feed 2), a solution of 2.31 g of a formaldehyde-free reducing agent (Bruggolite®FF6 M) in 43.86 g of deionized water is prepared. In a third vessel (feed 3) is placed 828 g of the miniemulsion. Feed 1 and 2 are started at a rate of 230 μL/min, followed by the start of feed 3 at a rate of 5.0 mL/min to be continuously metered over a period of 165 minutes. Feeds 1 and 2 are continued for an additional 40 minutes after the completion of feed 3, and the reaction is then held at 50° C. for 90 minutes further. After cooling to room temperature, the product is adjusted to a pH of 8 by the addition of aqueous ammonia and filtered through a 100 μm filter to give a dispersion with the following properties:
  Specific gravity: 1.058;
  Glass transition temperature: 16.5° C.;
  Solids content: 45.14%;
  Total remaining free monomer: <200 ppm
  Z-average particle size: 173 nm (PDI=0.20)

Comparative Example 1: Preparation of a Copolymer Dispersion CE1 from Ethylenically Unsaturated Phenyl Silicone Resin CB1

Step 1: Preparation of Miniemulsion

The miniemulsion is prepared by dissolving the ethylenically unsaturated silicone resin CB1 in a mixture of (meth) acrylic monomers (the monomer combination does not include 2-Hydroxyethyl methacrylate), followed by high pressure homogenization. The aim of the homogenization is to achieve a z-average particle size of 200 nm. Following is an example that uses an IKA® HPH 2000/5 high pressure homogenizer to prepare the miniemulsion:

Preparation of the silicone resin and (meth)acrylate monomer mixture:

The following components are added to a sealable vessel and mixed on an orbital shaker:

| Silicone resin CB1 | 260.00 g |
|---|---|
| Butyl acrylate | 253.24 g |
| Methyl methacrylate | 170.30 g |
| Butyl methacrylate | 74.64 g |
| Styrene | 42.57 g |
| Methacrylic acid | 11.61 g |
| Hexadecane | 3.87 g |
| Total | 816.23 g |

The resulting mixture is combined with a solution of the following components and mixed on an orbital shaker for approximately 1 h until a stable pre-emulsion is formed:

| Sodium dodecyl sulfate (SDS) | 24.44 g |
|---|---|
| Hydroquinone monomethylether (2% solution in water) | 3.77 g |
| Deionized water | 455.00 g |
| Total | 1300.00 g |

The pre-emulsion is passed through the high pressure homogenizer at a pressure of 400-800 bar to produce a miniemulsion with a z-average particle size of 156 nm (PDI=0.16).

Step 2: Polymerization

A 3 L polymerization vessel equipped with an anchor stirrer, a reflux condenser, a thermometer, and a nitrogen inlet is charged with 250.17 g of deionized water, and 72 g of the miniemulsion prepared in Step 1 as the initial charge and heated to 50° C. In one sealable vessel (feed 1), a solution of 4.62 g of tertiary butyl hydroperoxide (TBHP) in 38.34 g of deionized water is prepared. In a second sealable vessel (feed 2), a solution of 2.31 g of a formaldehyde-free reducing agent (Bruggolite®FF6 M) in 43.86 g of deionized water is prepared. In a third vessel (feed 3) is placed 828 g of the miniemulsion. Feed 1 and 2 are started at a rate of 230 μL/min, followed by the start of feed 3 at a rate of 5.0 mL/min to be continuously metered over a period of 165 minutes. Feeds 1 and 2 are continued for an additional 45 minutes after the completion of feed 3, and the reaction is then held at 50° C. for 90 minutes further. After cooling to room temperature, the product is adjusted to a pH of 8 by the addition of aqueous ammonia and filtered through a 100 μm filter to give a dispersion with the following properties:
  Specific gravity: 1.070;
  Glass transition temperature: 17.0° C.;
  Solids content: 46.58%;
  Total remaining free monomer: <300 ppm
  Z-average particle size: 151 nm (PDI=0.18).

Comparative Example 2: Preparation of a Copolymer Dispersion CE2 from Ethylenically Unsaturated Phenyl Silicone Resin CB2

Step 1: Preparation of Miniemulsion

The miniemulsion is prepared by dissolving the silicone resin in a mixture of (meth)acrylic monomers (the monomer combination does not include 2-Hydroxyethyl methacrylate), followed by high pressure homogenization. The aim of the homogenization is to achieve a z-average particle size of 200 nm. Following is an example that uses an IKA® HPH 2000/5 high pressure homogenizer to prepare the miniemulsion:

The following components are added to a sealable vessel and mixed on an orbital shaker:

| | |
|---|---|
| Silicone resin CB2 | 154.74 g |
| Butyl acrylate | 306.29 g |
| Methyl methacrylate | 350.32 g |
| Hexadecane | 5.45 g |
| Total | 816.80 g |

The resulting mixture is combined with a solution of the following components and mixed on an orbital shaker for approx. 1 h until a stable pre-emulsion is formed:

| | |
|---|---|
| Sodium dodecyl sulfate (SDS) | 24.46 g |
| Hydroquinone monomethylether (2% solution in water) | 3.74 g |
| Deionized water | 455.00 g |
| Total | 1300.00 g |

The pre-emulsion is passed through the high pressure homogenizer at a pressure of 400-800 bar. to produce a miniemulsion with a z-average particle size of 206 nm (PDI=0.22).

Step 2: Polymerization

A 3 L polymerization vessel equipped with an anchor stirrer, a reflux condenser, a thermometer, and a nitrogen inlet is charged with 0.108 g ethylenediaminetetraacetic acid (EDTA) disodium salt, 0.108 g of ironammoniumsulfate hexahydrate, 250.17 g of deionized water, and 72 g of the miniemulsion prepared in Step 1 as the initial charge and heated to 50° C. In one sealable vessel (feed 1), a solution of 4.62 g of tertiary butyl hydroperoxide (TBHP) in 38.58 g of deionized water is prepared. In a second sealable vessel (feed 2), a solution of 2.31 g of a formaldehyde-free reducing agent (Bruggolite®FF6 M) in 43.86 g of deionized water is prepared. In a third vessel (feed 3) is placed 828 g of the miniemulsion. Feed 1 and 2 are started at a rate of 230 μL/min, followed by the start of feed 3 at a rate of 5.0 mL/min to be continuously metered over a period of 165 minutes. Feeds 1 and 2 are continued for an additional 40 minutes after the completion of feed 3, and the reaction is then held at 50° C. for 90 minutes further. After cooling to room temperature, the product is adjusted to a pH of 8 by the addition of aqueous ammonia and filtered through a 100 μm filter to give a dispersion with the following properties:

Specific gravity: 1.054;

Glass transition temperature: 11.7° C.;

Solids content: 45.44%;

Total remaining free monomer: <100 ppm

Z-average particle size: 131 nm (PDI=0.16).

Applications in Industrial Coating Formulations

The copolymer dispersions were used in an industrial waterborne coating formulation that contains a polyisocyanate based hardener Bayhydur® XP 2547 (polyisocyanate based on hexamethylene diisocyanate, available at Covestro). In a typical formulation, the isocyanate hardener was mixed with the copolymer dispersions with a Cowles blade at 1000 rpm for approximately 30 s. Films (approximately between 23-27 μm dry thickness) were evaluated after application of the formulations with a bird bar on Aluminum Q-panels followed by drying at room temperature and 50-55% relative humidity. The film durability was measured by MEK Double Rub Test (ASTM D5402) after one week. The higher the value the more durable is the film. The formulation compositions and the test results are shown in Table 1.

TABLE 1

Formulation examples with the inventive and comparative copolymer dispersions

| Material Name | Formulation F1 (inventive, based on copolymer dispersion E2) | Formulation F2 (inventive, based on copolymer dispersion E1) | Formulation C1 (comparative, based on copolymer dispersion CE1) | Formulation C2 (comparative, based on copolymer dispersion CE2) |
|---|---|---|---|---|
| E2 | 23.94 g | — | — | — |
| E1 | — | 25.01 g | — | — |
| CE1 | — | — | 25.27 g | — |
| CE2 | — | — | — | 25.24 g |
| Polyisocyanate: Bayhydur ® XP 2547 | 20.79 g | 21.61 g | 21.78 g | 21.46 g |
| Dry film thickness (μm) | 25.4 | 23.9 | 25.4 | 26.2 |
| MEK Double Rub number | 100 | 100 | 60 | 1 |

According to table 1, formulations F1 and F2 of inventive dispersions E1 and E2 based on inventive copolymers having crosslinkable HO-functional groups (by use of 2-hydroxyethyl methacrylate as monomer (C)) showed better MEK Double Rub Test values compared to the formulations $C_1$ and $C_2$ of non-inventive dispersions CE1 and CE2 based on non-inventive copolymers having no crosslinkable HO-functional groups (no use of 2-hydroxyethyl methacrylate).

This indicates better durability of the film formed from the copolymer dispersions with reactive functional groups that form crosslinks with the isocyanate groups of the hardener during cure.

The non-inventive copolymer of the non-inventive dispersion CE1 has no crosslinkable HO-functional groups (no use of 2-hydroxyethyl methacrylate) but it contains a small amount of crosslinkable functional groups (—COOH) because methacrylic acid was used in a small amount of 2.1% by weight, based on ethylenically unsaturated monomer (A), by the free-radical polymerization. The small amount of these crosslinkable functional groups does not lead to crosslinking with the isocyanate group of the hardener.

What is claimed is:

1. An aqueous dispersion, comprising:
    wherein the aqueous dispersion is a dispersion of crosslinkable reactive silicone organic copolymers of ethylenically unsaturated monomers and of ethylenically functionalized silicone polymers, obtainable by means of radically initiated miniemulsion polymerization in an aqueous medium of
    (A) one or more ethylenically unsaturated organic monomers, or monomers selected from the group consisting of vinyl esters, (meth)acrylic esters, vinylaromatics, olefins, 1,3-dienes, vinyl ethers, and vinyl halides,
    in the presence of
    (B) at least one silicone polymer, or a silicone resin, which is functionalized with ethylenically unsaturated, radically polymerizable groups and consists of siloxane units of the general formula

$[R^1_p(OR^2)_z SiO_{(4-p-z)/2}]$ (1), wherein $R^1$ is identical or different at each occurrence and is a radical R* or E;
        wherein R* is identical or different at each occurrence and is a hydrogen atom or is a hydrocarbon radical which is free from aliphatic multiple C—C bonds, has 1 to 18 carbon atoms, and may optionally be substituted; and
        wherein E is an ethylenically unsaturated radical of the formula —$(CR^5_2)_m$—X;
            wherein m is an integer from 1 to 10;
            wherein $R^5$ is a hydrogen atom, a $C_1$-$C_{12}$ alkyl radical or a $C_6$-$C_{18}$ aryl radical; and
            wherein X is an ethylenically unsaturated organic group;
    wherein R 1 is an ethylenically unsaturated radical E in at least 1 mol % and at most 50 mol % of all siloxane units (I);
    wherein $R^2$ is identical or different at each occurrence and is a hydrogen atom or a hydrocarbon radical having 1 to 18 carbon atoms;
    wherein p is 0, 1, 2 or 3;
    wherein z is 0, 1, 2 or 3;
    wherein the sum p+z has a value of 0, 1, 2 or 3 and for at least 20 mol % of all siloxane units of the formula (1) in the silicone polymer (B), the sum p+z is 1 or 0, with p being 1 or 0 and z being 0;
    and in the presence of
    (C) at least one compound which have an ethylenically unsaturated radical and at least one additional functional group which is not free radically polymerized but capable for crosslinking, in an amount of 10 to 50% by weight based on the total weight of (A);
    wherein the miniemulsion polymerization being carried out by preparation in the first step of a solution of at least one silicone polymer (B) in one or more ethylenically unsaturated monomers (A), to give a silicone-in-monomer solution;
    wherein emulsification in the second step of the resulting silicone-in-monomer solution, using emulsifiers, optionally hydrophobic coemulsifiers, and optionally polymerization inhibitors which prevent premature radical emulsion polymerization, in water in such a way as to give a miniemulsion having particle size D (50) of not more than 350 nm;
    wherein the compound (C) is added in the first step during the preparation of the silicone-in-monomer solution or in the second step during the emulsification to form the miniemulsion;
    wherein subjection in the third step of the resulting miniemulsion to radical emulsion polymerization; and
    wherein the miniemulsion polymerization is carried out using water-soluble or oil-soluble, or a mixture of water-soluble and oil-soluble, polymerization initiators.

2. The aqueous dispersion of claim 1, wherein E is a radical of the formula —$(CH_2)_3$—X, where X is an ethylenically unsaturated organic group.

3. The aqueous dispersion of claim 1, wherein X is an acrylic or methacrylic radical.

4. The aqueous dispersion of claim 1, wherein for at least 20 mol % of all siloxane units of the formula (I) in the silicone polymer (B), the sum p+z is 1 or 0, with p being 1 or 0 and z being 0.

5. The aqueous dispersion of claim 1, wherein the radicals R* are at least two different radicals selected from the group of carbon-richer hydrocarbon radicals having 6 to 18 carbon atoms, isooctyl radicals, phenyl radicals, carbon-poorer radicals having 1 to 3 carbon atoms, and methyl radicals.

6. The aqueous dispersion of claim 1, wherein the compounds (C) are monomers selected from the group consisting of
    ethylenically unsaturated alcohols, hydroxyalkyl (meth) acrylates, 2-hydroxyethyl methacrylate, hydroxypropyl methacrylate, 2-hydroxyethyl acrylate, or hydroxypropyl acrylate and glycerol 1-allyl ether;
    ethylenically unsaturated monocarboxylic and dicarboxylic acids and their salts;
    ethylenically unsaturated sulfonic acids and their salts;
    ethylenically unsaturated primary, secondary or tertiary amines, 2-dimethylaminoethyl methacrylate, 2-tert-butylaminoethyl methacrylate, allyl N-(2-aminoethyl) carbamate hydrochloride, allyl N-(6-aminohexyl) carbamate hydrochloride, allyl N-(3-aminopropyl) hydrochloride, allylamine or vinylpyridine;
    ethylenically unsaturated amides;
    ethylenically unsaturated phosphonic acids and their salts;
    ethylenically unsaturated epoxides;
    ethylenically unsaturated isocyanates;
    ethylenically unsaturated anhydrides;
    ethylenically unsaturated monomers containing reactive carbonyl groups, for example, acrolein, methacrolein, diacetone acrylamide, diacetone methacrylamide, 2-butanone methacrylate, formyl styrol, diacetone acrylate, diacetone methacrylate, acetonitrile acrylate, acetoacetoxyethyl methacrylate, acetoacetoxyethyl acrylate and vinylaceto acetate; and
    ethylenically unsaturated organosilanes with reactive groups.

7. A method for producing an aqueous dispersion of crosslinkable reactive silicone organic copolymers of ethylenically unsaturated monomers and of ethylenically functionalized silicone polymers, comprising the steps of:
radically initiating a miniemulsion polymerization in an aqueous medium of
(A) one or more ethylenically unsaturated organic monomers, or monomers selected from the group consisting of vinyl esters, (meth)acrylic esters, vinylaromatics, olefins, 1,3-dienes, vinyl ethers, and vinyl halides, in the presence of
(B) at least one silicone polymer, or a silicone resin, which is functionalized with ethylenically unsaturated, radically polymerizable groups and consists of siloxane units of the general formula $$[R^1_p(OR^2)_z SiO_{(4-p-z)/2}] \qquad (I),$$

where $R^1$ is identical or different at each occurrence and is a radical $R^*$ or E;
wherein $R^*$ is identical or different at each occurrence and is a hydrogen atom or is a hydrocarbon radical which is free from aliphatic multiple C—C bonds, has 1 to 18 carbon atoms, and may optionally be substituted; and
wherein E is an ethylenically unsaturated radical of the formula $-(CR_5^2)_m-X$;
wherein m is an integer from 1 to 10, preferably 3;
wherein $R^5$ is a hydrogen atom, a $C_1$-$C_{12}$ alkyl radical or a $C_6$-$C_{18}$ aryl radical; and
wherein X is an ethylenically unsaturated organic group;
wherein $R^2$ is identical or different at each occurrence and is a hydrogen atom or a hydrocarbon radical having 1 to 18 carbon atoms;
wherein $R^1$ is an ethylenically unsaturated radical E in at least 1 mol % and at most 50 mol % of all siloxane units (I);
wherein p is 0, 1, 2 or 3;
wherein z is 0, 1, 2 or 3;
wherein the sum p+z has a value of 0, 1, 2 or 3; and
wherein for at least 20 mol % of all siloxane units of the formula (I) in the silicone resin (B), the sum p+z is 1 or 0, with p being 1 or 0 and z being 0;
and in the presence of
(C) at least one compound which have an ethylenically unsaturated radical and at least one additional functional group which is not free radically polymerized but capable for crosslinking, in an amount of 10 to 50% by weight based on the total weight of (A);
wherein the miniemulsion polymerization being carried out by preparation in a first step of a solution of at least one silicone polymer (B) in one or more ethylenically unsaturated monomers (A), to give a silicone-in-monomer solution;
wherein emulsification in a second step of the resulting silicone-in-monomer solution, using emulsifiers, optionally hydrophobic coemulsifiers, and optionally polymerization inhibitors which prevent premature radical emulsion polymerization, in water in such a way as to give a miniemulsion having a particle size D (50) of not more than 350 nm, with the proviso that compound (C) is added in the first step during the preparation of the silicone-in-monomer solution or in the second step during the emulsification to form the miniemulsion;
wherein subjection in a third step of the resulting miniemulsion to radical emulsion polymerization; and
wherein the miniemulsion polymerization is carried out using water-soluble or oil-soluble, or a mixture of water-soluble and oil-soluble, polymerization initiators.

8. The method of claim 7, wherein E is a radical of the formula $-(CH_2)_3-X$, wherein X is an ethylenically unsaturated organic group.

9. The method of claim 7, wherein X is an acrylic or methacrylic radical.

10. The method of claim 7, wherein for at least 20 mol % of all siloxane units of the formula (I) in the silicone polymer (B), the sum p+z is 1 or 0, with p being 1 or 0 and z being 0.

11. The method of claim 7, wherein the radicals $R^*$ are at least two different radicals selected from the group of carbon-richer hydrocarbon radicals having 6 to 18 carbon atoms, isooctyl radicals, phenyl radicals, carbon-poorer radicals having 1 to 3 carbon atoms, and methyl radicals.

12. The method of claim 7, wherein the compounds (C) are monomers selected from the group consisting of
ethylenically unsaturated alcohols, preferably hydroxyalkyl (meth)acrylates, more preferably 2-hydroxyethyl methacrylate, hydroxypropyl methacrylate, 2-hydroxyethyl acrylate, hydroxypropyl acrylate, or glycerol 1-allyl ether;
ethylenically unsaturated monocarboxylic and dicarboxylic acids and their salts, preferably crotonic acid, acrylic acid, methacrylic acid, fumaric acid and maleic acid;
ethylenically unsaturated sulfonic acids and their salts, preferably vinylsulfonic acid and 2-acrylamido-2-methylpropanesulphonic acid;
ethylenically unsaturated primary, secondary or tertiary amines, preferably 2-dimethylaminoethyl methacrylate, 2-tert-butylaminoethyl methacrylate, allyl N-(2-aminoethyl) carbamate hydrochloride, allyl N-(6-aminohexyl) carbamate hydrochloride, allyl N-(3-aminopropyl) hydrochloride, allylamine and vinylpyridine;
ethylenically unsaturated amides, preferably 3-dimethylaminopropylmethacrylamide and 3-trimethylammoniumpropylmethacrylamide chloride;
ethylenically unsaturated phosphonic acids and their salts, preferably vinylphosphonic acid;
ethylenically unsaturated epoxides, preferably glycidyl methacrylate (GM A);
ethylenically unsaturated isocyanates, preferably 1-(isocyanato-1-methyl)-3-(methylethyl)benzene;
ethylenically unsaturated anhydrides, preferably maleic anhydride;
ethylenically unsaturated monomers containing reactive carbonyl groups, for example, acrolein, methacrolein, diacetone acrylamide, diacetone methacrylamide, 2-butanone methacrylate, formyl styrol, diacetone acrylate, diacetone methacrylate, acetonitrile acrylate, acetoacetoxyethyl methacrylate, acetoacetoxyethyl acrylate and vinylaceto acetate; and
ethylenically unsaturated organosilanes with reactive groups, preferably methacryloyloxypropyltrimethoxysilane and vinyltrimethoxysilane.

13. A crosslinkable composition, comprising:
an aqueous dispersion of crosslinkable reactive silicone organic copolymers as claimed in claim 1 having functional groups capable for crosslinking; and crosslinkers.

14. The crosslinkable composition of claim 13, wherein the functional groups are hydroxyalkyl groups that are capable for crosslinking by reacting with isocyanate groups; and wherein the crosslinkers are organic compound having 2 or more isocyanate groups.

15. The crosslinkable composition of claim 13, wherein the crosslinkable composition is a film that is applied to a substrate and then allowed to crosslink.

16. The crosslinkable composition of claim 13, wherein the functional groups are capable for crosslinking through reaction with themselves and then allowing to crosslink.

17. The crosslinkable composition of claim 13, wherein the crosslinkable composition is a coating.

18. The aqueous dispersion of claim 1, wherein the compounds (C) is present in an amount of 12 to 50% by weight based on the total weight of (A).

19. The aqueous dispersion of claim 7, wherein the compounds (C) is present in an amount of 12 to 50% by weight based on the total weight of (A).

* * * * *